DEVICE EMPLOYING IGFET IN COMBINATION WITH SCHOTTKY DIODE

Filed June 5, 1967

INVENTOR
D. KAHNG
BY
Arthur J. Torsiglieri
ATTORNEY

United States Patent Office 3,543,052

Patented Nov. 24, 1970

3,543,052

DEVICE EMPLOYING IGFET IN COMBINATION WITH SCHOTTKY DIODE

Dawon Kahng, Somerville, N.J., assignor to Bell Telephone Laboratories, Incorporated, Murray Hill, N.J., a corporation of New York Filed June 5, 1967, Ser. No. 643,658
Int. Cl. H03k *17/04, 17/74*
U.S. Cl. 307—238 2 Claims

ABSTRACT OF THE DISCLOSURE

A nondestructive memory element is formed by locating a nonlinear element, such as a Schottky barrier diode, in the gate circuit of an insulated gate field effect transistor. Use is made of the high resistance at voltages below a critical level of the Schottky barrier diode to trap charges on the gate electrode, whereby the field effect transistor is maintained in a low resistance state even after the applied gate voltage is removed.

This invention relates to semiconductive apparatus which is characterized by memory, i.e., apparatus which will persist in a selected conductive state even after the force used to induce the selected state terminates.

In my application Ser. No. 643,659, filed contemporaneously with this application and having a common assignee, there is described semiconductor apparatus which is capable of relatively long memories, i.e. minutes and hours. In some applications, shorter memories are adequate and the instant application relates more specifically to apparatus adapted for providing relatively short memories, seconds or fractions of seconds, with a consequent increase of simplicity over the structures described in my copending application. In particular, the structures of the copending application are dependent on the trapping of charges which are transported through an insulating layer under the influence of strong fields and are trapped in a floating electrode. On the other hand, the instant structures involve use simply of an appropriate branch circuit connected to the gate of an insulated gate field effect transistor. More specifically, use is made of the fact that the impedance of the gate of such a transistor is exceedingly high whereby a charge deposited thereon will persist for relatively long times, i.e., seconds, in the absence of a suitable discharge path other than through the semiconductive element. In particular, to achieve the storage desired, the charging and discharging path associated with the gate electrode is arranged to have a nonlinear impedance offering a relatively low impedance to high level supplied currents but a relatively high impedance to relatively lower level leakage currents. Moreover, because readout does not affect the charge trapped on the gate, readout is nondestructive.

A more specific feature of a preferred embodiment of the invention is the inclusion of a Schottky barrier diode integral with the field effect transistor in a common semiconductive crystal to serve as the nonlinear element. A Schottky barrier diode has advantages over a conventional p-n junction diode because in the former the conduction is due to majority carriers, while in the latter the forward conduction is due to the injection and recombination of minority carriers and accordingly the recovery of the high impedance state at the termination of the forward voltage is controlled by the minority carrier life time.

The invention will be more fully described in connection with the accompanying drawing in which:

Each of FIGS. 1 and 3 shows an insulated gate field effect transistor operating in the inversion mode connected in a circuit arrangement in accordance with a different form of the invention.

Figure 1:
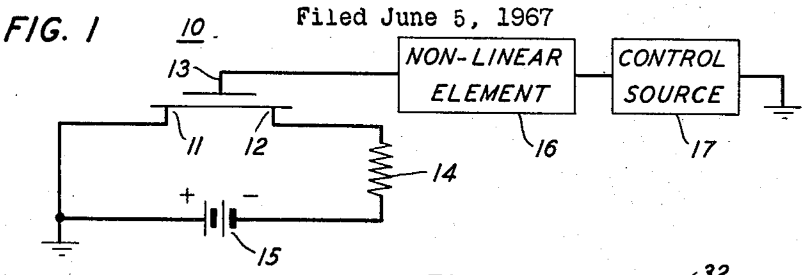

With reference now specifically to the drawing, an insulated gate field effect transistor 10, with source, drain and gate connections 11, 12 and 13, respectively, has the load 14 and voltage source 15 connected between its source and drain and the nonlinear element 16 and control source 17 connected between the gate and source.

By way of example, the insulated gate field effect transistor 10 is of the PNP type operating in an inversion mode such that in the absence of any induced electric field in the semiconductive element a high internal resistance is presented to the passage of current between the source and drain.

Figure 5:
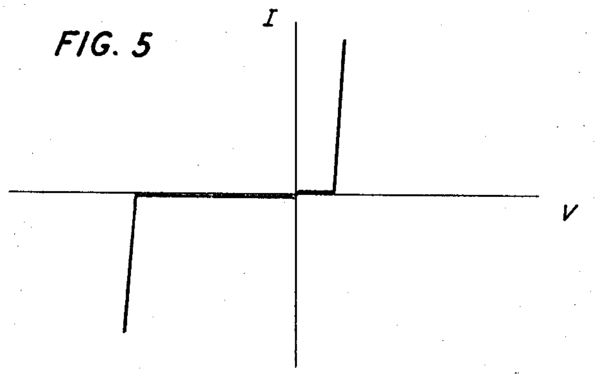
FIG. 5 illustrates the nonlinear voltage-current characteristic of a Schottky barrier diode.

Also advantageously, the nonlinear element 16 is a Schottky barrier diode having the voltage-current characteristic depicted in FIG. 5. It can be noted from the characteristic that in both the forward and reverse directions a Schottky barrier diode has at low voltages a high resistance which decreases abruptly to a low resistance when the voltage exceeds a certain value, which in the forward direction is dependent largely on the height of the barrier between the semiconductor and the metal contact, and in the reverse direction is dependent largely on the doping level in the semiconductor, in accordance with principles known to workers in the art.

In operation, for the storage of information, a negative pulse of amplitude sufficient to drive the Schottky diode 16 in the forward direction, to its low resistance state is supplied by the contact source 17. The consequent charging of the gate 13 to a negative voltage results in the formation of hole-rich or p-type inversion layer extending between the p-type source and drain zones whereby the internal resistance of the transistor between such zones is reduced and appreciable current flows through the load 14. Moreover, when the applied negative pulse terminates, the voltage across the diode 16 has the opposite polarity thus putting the diode 16 in reverse bias and the diode 16 assumes a high resistance state and thereafter no longer offers a low resistance path for the discharge of the charge built up on the gate 13. Similarly, because the gate electrode is insulated from the semiconductive element, discharge through the semiconductive element is inappreciable. As a consequence, this charge on the gate electrode is trapped in the sense that it has no low resistance discharge path available. Of course, there will be some leakage both by way of the diode 16 and defects in the insulating layer of the transistor but this will be small and permits the charge to be stored readily for many seconds, during which time, there will continue to be a low resistance path between the source and drain, permitting nondestructive readout so long as a negative pulse was the last applied by the control source.

Erasing can be achieved readily simply by applying from the control source 17 a positive pulse of sufficient amplitude to put diode 16 in a low resistance reverse state whereby the charge stored on the gate is discharged by way of the diode 16, the inversion layer destroyed, and the internal resistance between the source and drain restored to its normally high value resulting from the presence therebetween of a reverse-biased p-n junction.

Figure 2:
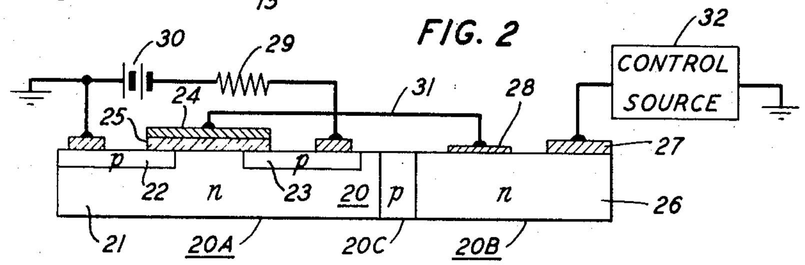
FIGS. 2 and 4 illustrate monolithic combinations of an insulated gate field effect transistor and a Schottky barrier diode connected in circuits of the kind shown in FIGS. 1 and 3, respectively.

FIG. 2 illustrates how the desired field-effect transistor and Schottky diode may be integrated in a single monolithic structure. A single crystal 20, typically of silicon, includes a transistor portion 20A spaced from a diode portion 20B by the p-type isolation zone 20C. The transistor portion comprises the n-type bulk portion 21 and the spaced p-type source and drain zones 22 and 23, respectively. The gate electrode 24 overlies the channel between the source and drain, spaced from the crystal by the insulating layer 25, which is typically of silicon dioxide or silicon nitride or a mixture of the two.

The diode portion 20B comprises the n-type base zone 26 to spaced portions of which are provided the low resistance ohmic connection 27 and the Schottky barrier forming electrode 28. The latter typically comprises a platinum layer sintered to form a platinum silicide region at the interface and an aluminum layer overlying this to which low resistance ohmic connection is made.

The construction of the structure described can readily be achieved by techniques well known in the art.

To achieve the circuit described in FIG. 1, the load 29 and voltage supply 30 are connected between low resistance connections to source 22 and drain 23, the gate 24 and the barrier electrode 28 are connected together by the conductor 31, and the control source 32 is connected to the electrode 27. In practice, the conductor 31 typically would be a conductive film deposited on the surface of the crystal 20 but insulated therefrom by a suitable intervening insulating layer.

Figure 3:
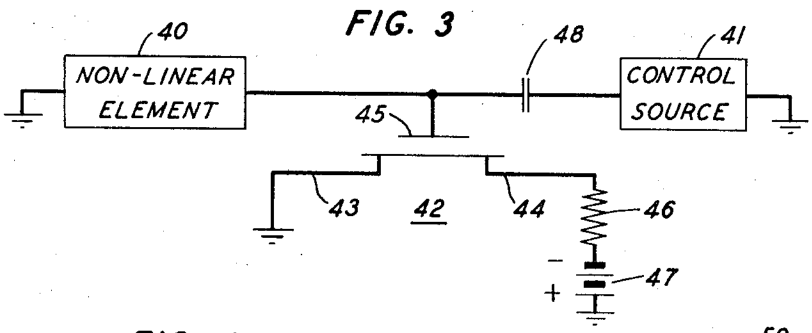

FIG. 3 illustrates a modified arrangement for interconnecting the nonlinear element 40 essentially in parallel with the capacitance of the gate of the field effect transistor. As above, a field effect transistor 42 of the PNP insulated gate inversion mode type, having source, drain and gate electrodes 43, 44 and 45, respectively is connected to have a load 46 and voltage supply 47 connected in its source-drain branch path and the control source 41 and capacitor 48 in shunt with the nonlinear element 40 connected in its source-gate branch path. As before, the nonlinear element 40 advantageously is a Schottky barrier diode having the voltage-current characteristic shown in FIG. 5.

In operation, in this case a positive voltage pulse supplied from the control source 41 serves initially to drain the Schottky barrier diode to a low resistance state as a consequence of which conduction is largely therethrough to ground. On termination of this pulse, the Schottky barrier returns to a high resistance state whereby change is trapped on the capacitor 48 which no longer has a low resistance discharge path. The trapped charge on capacitor 48 results in a negative charge on the gate 45 which gives rise to a p-type inversion layer in the channel of transistor 42 whereby current flows readily between its source and drain and through the load 46. Moreover, the charge on capacitor 48 persists for a relatively long time in the absence of a low resistance discharge path.

The application of a negative pulse by control source 41 has the opposite effect, resulting in a trapped charge on capacitor 48 such that the gate 45 is positively biased with a resulting high internal resistance in transistor 42 to the flow of current between its source and drain and through the associated load 46.

Figure 4:
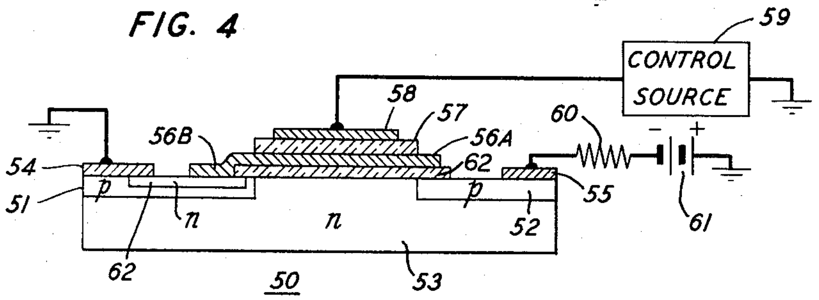

This circuit arrangement is even more readily amenable to integration as seen from FIG. 4. There is first provided the basic structure of a PNP insulated gate field effect transistor including a semiconductive crystal 50, advantageously of silicon, which includes localized p-type source and drain zones, 51 and 52, respectively in an n-type bulk 53 which provides the channel. Electrodes 54 and 55 form low resistance source and drain connections, respectively. Electrode 56 serves two roles. It includes a first portion 56A which overlies the channel between the source and drain zones, is insulated from it by the insulating layer 62, typically of silicon oxide, and serves as the gate electrode. It also includes a second portion 56B, electrically continuous with the first, which forms a Schottky barrier connection to the n-type zone 62. The zone 62 is an n-type zone located within the p-type source zone 51. The source electrode 54 makes low resistance connection both to the source zone 51 and the n-type zone at a location spaced from the electrode portion 56B. Alternatively, the Schottky diode can be formed in some other portion of the slice, for example in an isolated part of the n-type bulk. To this end, the electrode 56 advantageously is a layer of a conductor such as platinum which can be sintered to silicon for forming platinum silicide, which forms a good Schottky barrier connection with the underlying silicon. Moreover, over the portion of electrode 56 which effectively serves as the gate there is deposited an insulating layer 57 and a counter electrode 58 whereby there is effectively formed a capacitor to serve as the capacitor 48 in FIG. 3. The insulating layer 57 advantageously is formed by adding a zirconium or aluminum layer over the platinum and then oxidizing a portion of such added layer, before deposit of the counterelectrode 58.

The control source 59 is connected between electrode 58 and the source electrode 54 which is connected to ground. The load 60 and voltage source 61 are connected between source electrode 54 and the drain electrode 55.

It should be apparent that the specific embodiments described are merely illustrative of the general principles of the invention. Various modifications are possible consistent with the spirit of the invention. For example, various other forms of field effect transistors can be included, provided only that the gate impedance be sufficiently high so that discharge of the charge trapped on the gate through the transistor be sufficiently low. Similarly other forms of nonlinear elements may be used so long as there is provided a voltage-current characteristic which exhibits the desired nonlinear characteristic. Additionally, integration of the field-effect transistor and the nonlinear element can take a wide variety of forms depending on their specific natures.

Additionally, it will be readily appreciated that in practice there typically will be required a large number of individual storage elements of the kind described and that these typically will be used in a two-dimensional array to facilitate access. Accordingly, it will be advantageous to construct the individual storage elements in large arrays preferably in a single slice of semiconductor material as is now familiar practice to workers in the art.

Moreover, it will be noted that the memory elements of FIGS. 1 and 3 are complementary, in the sense that the former is set to its low resistance state by a negative pulse applied from the control source and requires a positive pulse from the control source for setting to a low resistance state. Moreover each utilizes the same kind of field-effect transistor. This makes it feasible to construct in a single crystal a plurality of identical field-effect transistors and then to utilize some in one of the two operating modes described and others in the other operating mode described.

It should also be apparent that the arrangements described can be adapted for the use of optical read-in and optical erasing by utilizing as the non-linear element a photosensitive element which in the dark presents a high resistance and in the light a low resistance. For instance, in the configuration shown in FIG. 1, the transistor can be put in a low-resistance state by the application of a negative pulse from the control source charging the gate negative and inducing an inversion layer in the transistor. In the absence of radiation the charges remain trapped.

When the photosensitive element is irradiated, even in the absence of any positive pulse from the control source, a discharge path is provided the trapped charge, thus reducing conduction in the transistor.

What is claimed is:

1. Semiconductive apparatus comprising an insulated gate field effect transistor having a source, drain and gate, a first branch circuit between said source and drain comprising a voltage source and load and a second branch circuit between source and gate including a control source and a Schottky barrier diode.

2. Apparatus for performing a memory function comprising:

a Schottky barrier diode and an insulated gate field effect transistor having a source, drain and gate;

a first branch circuit between source and drain comprising a voltage source and load;

means for applying a signal to said gate through said Schottky barrier diode which provides a relatively low impedance path between said signal means and said gate when said signal is present, and then a relatively large impedance when said signal is not present whereby charge stored on said gate remains trapped and current flows through the drain and source when said signal is not present.

References Cited

UNITED STATES PATENTS

| | | | |
|---|---|---|---|
| 3,463,975 | 8/1969 | Biard | 317—235 |
| 3,325,654 | 6/1967 | Mrazek | 307—320 |
| 3,268,658 | 8/1966 | Schroeder et al. | 307—251 X |
| 3,448,397 | 6/1969 | Lin et al. | 317—235 X |

OTHER REFERENCES

Electronics, "MOS FET for Analog Switching" Sept. 8, 1965, vol. 38.

Walton: IBM Technical Disclosure Bulletin, vol. 9, No. 2, July 1966 (pp. 199–201).

JOHN S. HEYMAN, Primary Examiner

U.S. Cl. X.R.

307—251, 256, 304, 318, 319; 317—235